UNITED STATES PATENT OFFICE.

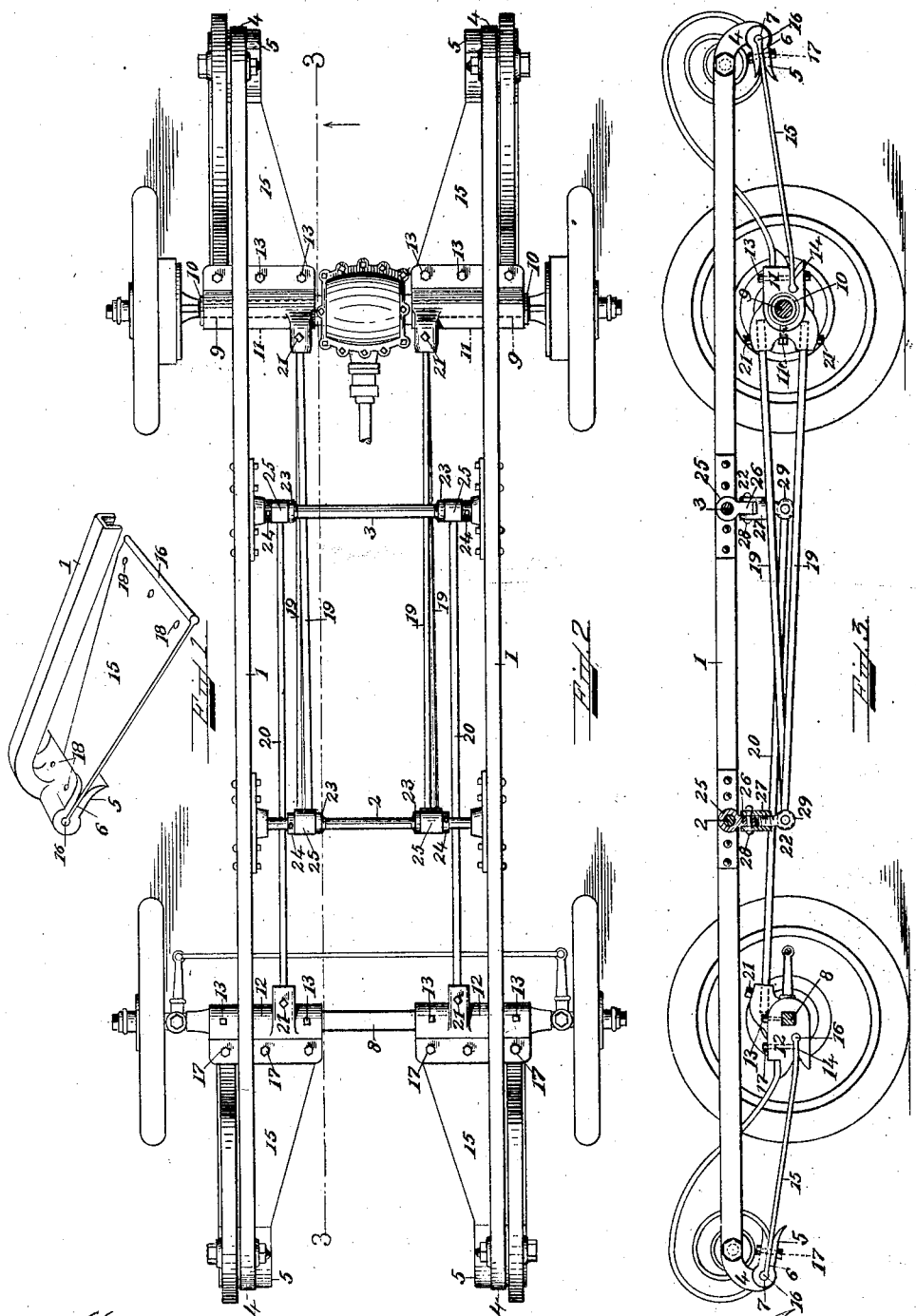

WILLIAM E. EASTMAN, OF BOSTON, MASSACHUSETTS.

VEHICLE AXLE-HOLDER.

1,056,406.

Specification of Letters Patent.

Patented Mar. 18, 1913.

Application filed June 10, 1911. Serial No. 632,501.

*To all whom it may concern:*

Be it known that I, WILLIAM E. EASTMAN, a citizen of the United States, and a resident of Boston, in the county of Suffolk and State of Massachusetts, have invented certain new and useful Improvements in Vehicle Axle-Holders, of which the following is a specification.

My invention relates particularly to devices for securing and maintaining the varying relative positions of carriage axles and springs.

The principal object of my invention is to provide between the frame of a vehicle and its axle, an oblique connection, which has a rigid, as distinguished from pivoted, connection at its extremities, and which can not be bent edgewise, but can lengthwise. With such a connection, there are no coacting moving parts to wear or require attention and lubrication; and sidewise movement of the axle, in relation to the frame, is resisted and prevented by it; while with any upward movement of the axle the latter tends to move in a vertical line, the bending of the connection, causing the axle to be drawn in toward the near ends of the frame, and out of what would be an arc were the connection a rigid radial rod rather than a flexible rod. Such a rigid connection is shown in United States Letters Patent No. 1,007,077, issued to me October 31, 1911, for spring suspension for vehicles.

A device embodying my invention is efficient, inexpensive and simple.

In the drawings illustrating the principle of my invention and the best mode now known to me of embodying the same in operative structure, Figure 1 exhibits in perspective, a portion of the down-swept end of the frame with one of my connections of axle holder plates in position to be secured thereto. Fig. 2 represents a plan of the vehicle frame illustrating the distribution of the brace bars, and the manner of their attachment to said frame, sleeves and axles. Fig. 3 is a longitudinal section of the same on broken line 3—3 of Fig. 2.

A carriage body supporting frame 1, is suitably strengthened transversely by the tie rods 2, 3, and has integral down-swept ends 4, 4, terminating in the bifurcated bearings 5, 5, provided with chambers or kerfs 6 terminating in bores 7, the openings of said kerfs facing inwardly or toward the front and rear axles 8 and 9 respectively. The rear axle 9 supports an encircling sleeve 10, to which chairs 11, 11, are confined in a rigid position by screw engaged bolts 13, Fig. 3; while the front axle 8 supports the chairs 12, 12, any movement independent of the axle being restricted by like bolts 13. Each rear down-swept end 4 is connected to the chair 11 of the rear axle 9 by an obliquely disposed axle holder plate 15 composed of flexible steel, preferably of the form illustrated, sufficiently subrigid to avoid fracture, yet sufficiently stable to be an operative structure; the transverse edges 16 of the plate 15 are in the form of integral circular beading, the latter and the thickness of the plate being such that they can be pushed sidewise into engagement with the corresponding kerfs 5 and bores 7 in the bearings 5, and the kerfs 14 in the chairs 11 on the rear axle 9, where they are fixed by means of bolts 17, 13, respectively. Plates 15 connect the forward down-swept ends 4, 4, with the chairs upon the forward axle 8, in a manner similar to that just described in reference to the rear axle 10. It will be obvious, that by this construction, the plates 15 will resist and prevent sidewise movement of the axles, relative to the frame, and will bend longitudinally, so that the movements of the axles up and down, will be substantially vertical in relation to the frame; yet, because of the kerfs and bores, and beaded edge portions of the blades, there will be, instead of pivots, or pivoted members, rigid anchorages for the flexible blades, and consequently, there will be no wear between the coöperating parts of the anchorage, one of the principal features of my invention.

In order to hold the chairs 11, 12, and axles 8, 10, in proper relations, a series of bars 19, 19, longitudinal with, and disposed below the plane of, the frame, extend from the bosses of the rear axle chairs 11, to the tie rod 2 adjacent the axle 8; while a set of bars 20, 20, extend from the bosses of the front axle chairs 12, 12, to the tie rod 3 adjacent the axle 9. One end of each set of said bars is similarly and rigidly secured to the chairs 11, 12, respectively, being pendently secured in hangers 22 oscillatingly suspended from the tie rods 2, 3, and confined in position transversely of the frame, by the abutments 23 and collars 24. The hangers comprise threefold parts, and have substantially universal movement. Suspension eye pieces 25, Fig. 3, loosely embrace the tie rods 2, 3, and have rectangular bodies 26. To each of these is swung a biforked cylindrical member 27 by a pivot bolt 28, the lower half of said member being internally screw-threaded to receive the externally screw-threaded eye bolt 29, to which in turn is also pivotally attached the inward ends of the two sets of bars 19, 20.

It will be understood, therefore, that the eye pieces oscillate longitudinally, the cylindrical members transversely, and the eye bolts semi-rotatably, when said devices are assembled.

Through the adoption of my invention, I am enabled to control the diverse movements of the carriage axles, in a thoroughly practical and effective manner.

While changes may be made in the details, and in the arrangements of the several elements of my invention, I do not restrict myself to the specific embodiments herein given for the purpose of illustration; and desiring to protect my invention in the broadest manner legally possible,

What I claim is:—

1. A vehicle axle holder comprising a subrigid plate provided with integral beads transversely of its length, said beads being adapted to serve in anchoring said plate in the first instance to the frame, and in the second instance to the vehicle; and means in said plate for rigid confinement thereof, to obviate lateral movement of the axle relative to the frame.

2. An improved frame elastically supporting the vehicle body, provided with terminals having integral bearings; obliquely arranged subrigid flexible axle holding plates rigidly secured in said bearings; and means attached to the carriage axles to receive and secure said plates, in a manner to eliminate any lateral movement of said axles.

3. An improved elastically supported carriage frame having bearings provided with reëntering kerfs; a series of obliquely arranged subrigid, yielding sustaining plates, having opposite beaded edges; and a series of chairs on the axles of the carriage, having similar kerfs; said kerfs being designed to receive and retain the edges of said plates.

In testimony whereof I have affixed my signature, in presence of two witnesses.

WILLIAM E. EASTMAN.

Witnesses:
 CHAS. B. SPENCER,
 GEO. W. CAULKINS.